United States Patent
Wammes

(10) Patent No.: US 11,119,348 B2
(45) Date of Patent: Sep. 14, 2021

(54) OPTICAL ARRANGEMENT FOR IMPROVING THE DISPLAY QUALITY OF A DISPLAY

(71) Applicant: BSH HAUSGERAETE GMBH, Munich (DE)

(72) Inventor: Klaus Wammes, Bechtheim (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/980,229

(22) PCT Filed: Mar. 22, 2019

(86) PCT No.: PCT/EP2019/057322
§ 371 (c)(1),
(2) Date: Sep. 11, 2020

(87) PCT Pub. No.: WO2019/180245
PCT Pub. Date: Sep. 26, 2019

(65) Prior Publication Data
US 2021/0011330 A1 Jan. 14, 2021

(30) Foreign Application Priority Data
Mar. 23, 2018 (DE) .......................... 102018204506

(51) Int. Cl.
*G02F 1/1335* (2006.01)
*G02F 1/1333* (2006.01)
(Continued)

(52) U.S. Cl.
CPC .... *G02F 1/133502* (2013.01); *G02F 1/13338* (2013.01); *G02F 1/13362* (2013.01);
(Continued)

(58) Field of Classification Search
CPC .......... G02F 1/133502; G02F 1/13338; G02F 1/133528; G02F 1/13362; G02F 1/13363; G02F 1/133638; G02B 27/281
See application file for complete search history.

(56) References Cited

U.S. PATENT DOCUMENTS

| | | |
|---|---|---|
| 3,682,531 A | 8/1972 | Jeffers |
| 6,271,969 B1 | 8/2001 | Mertz |
| 2009/0009050 A1 * | 1/2009 | Kanade ................... H01J 61/00 313/484 |

FOREIGN PATENT DOCUMENTS

| | | | |
|---|---|---|---|
| DE | 69923152 T2 | 12/2005 | |
| DE | 102014211339 A1 * | 12/2015 | .......... G02B 27/283 |
| DE | 102014211339 A1 | 12/2015 | |

* cited by examiner

*Primary Examiner* — Donald L Raleigh
(74) *Attorney, Agent, or Firm* — Laurence A. Greenberg; Werner H. Sterner; Ralph E. Locher

(57) ABSTRACT

An optical arrangement includes at least the following components which are arranged along an optical axis: a light source for polarized light; a layer arrangement, which, viewed in the viewing direction of a viewer, includes at least one polarization filter and an optical retardation layer behind the polarization filter. The polarization filter abuts the retardation layer free of gaps. An interstice is located between the light source and the layer arrangement. The interstice has a volume about the optical axis, that is surrounded by optically impermeable and internally non-reflecting, but absorbent peripheral surfaces. In the interstice, there is at least one semi-permeable boundary surface which is permeable to the light emitted by the light source and is at least partially reflective for light that is incident in the opposite direction.

15 Claims, 1 Drawing Sheet

(51) Int. Cl.
*G02F 1/13357* (2006.01)
*G02F 1/13363* (2006.01)

(52) U.S. Cl.
CPC .... *G02F 1/13363* (2013.01); *G02F 1/133528* (2013.01); *G02F 1/133638* (2021.01); *G02F 2201/50* (2013.01)

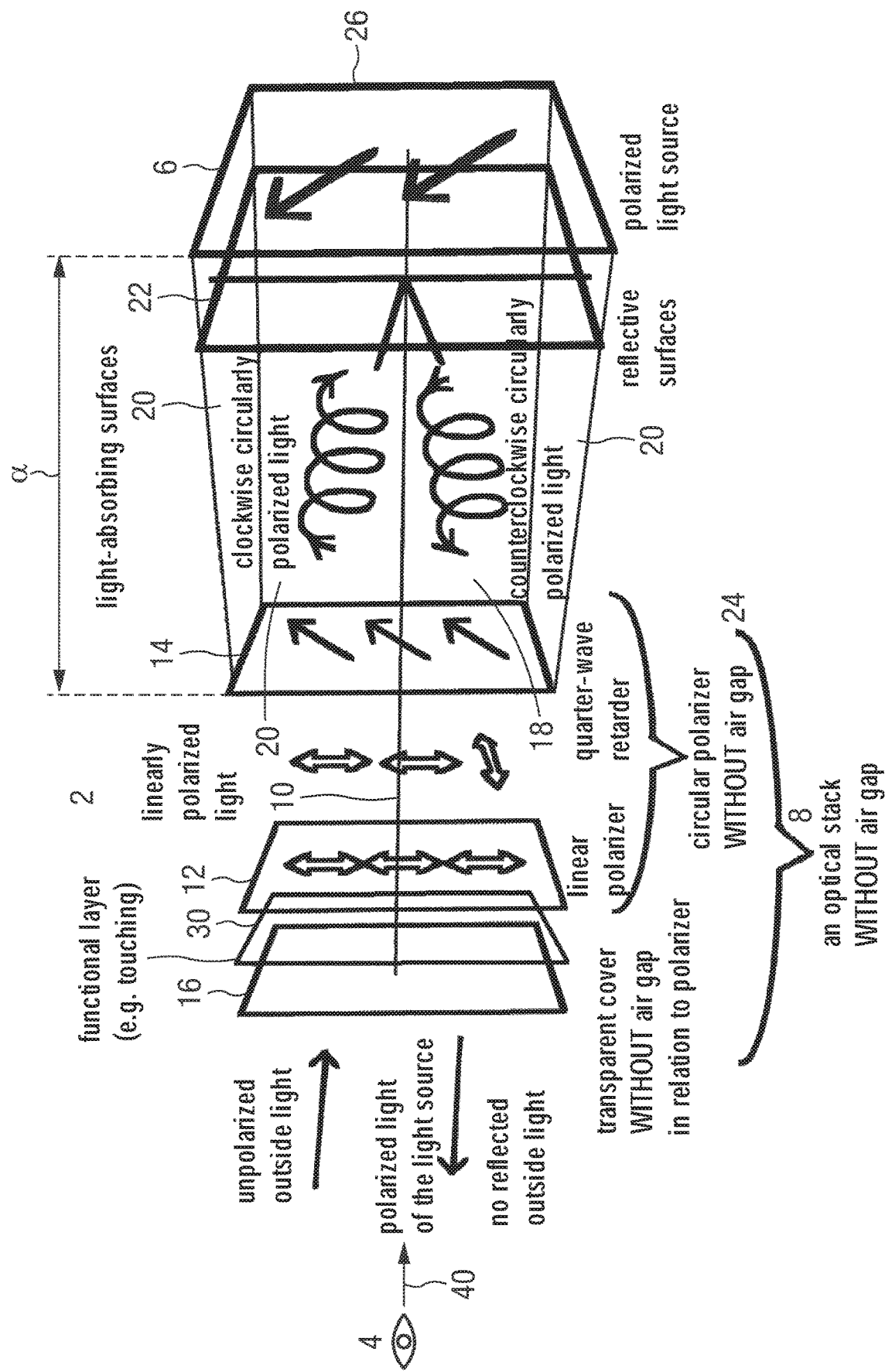

OPTICAL ARRANGEMENT FOR IMPROVING THE DISPLAY QUALITY OF A DISPLAY

BACKGROUND OF THE INVENTION

Field of the Invention

A display (screen or monitor) is usually an electrically controlled display without moving parts for optical signaling of changing information such as pictures or characters. A multiplicity of varieties is known which play an increasingly important role in practically all areas of daily life and technology.

Increasingly, such electronic displays are being installed together with additional functions such as, for example, touch-sensitive sensors, touch sensors for short, which enable a device with a display equipped in this way to be operated directly by touching the functional elements shown.

Preventing the display quality and the visual appearance being affected by these additional functions presents a challenge in technical terms. Rather, it is desirable to combine comfort features such as, for example, touch control with other comfort and quality features such as excellent display quality and as little ambient light interference as possible. In particular, a high perceptible contrast and high color saturation as well as a homogeneous black display when switched off or of dark image areas are desired.

SUMMARY OF THE INVENTION

The object of the invention is to indicate a technical solution which is capable of improving the display quality of a display, in particular of a display with touch functionality, in the aforementioned sense using simple means and simple and inexpensive production. In particular, it is desirable to significantly suppress optical artifacts from the ambient light or not let them take effect, which should result in a homogeneous black display window—in any size—when switched off or not illuminated.

The object is achieved according to the invention by means of an optical arrangement as claimed.

Accordingly, the optical arrangement according to the invention comprises the following components which are arranged along an optical axis:
A light source for polarized light,
A layer arrangement which, viewed in the viewing direction of a viewer, comprises at least one polarization filter and an optical retardation layer (retarder) behind the same,
wherein
The polarization filter abuts the retardation layer free of gaps,
An interstice is located between the light source and the layer arrangement, and
The interstice comprises a volume about the optical axis, said volume being surrounded by optically impermeable and internally non-reflecting, but absorptive peripheral surfaces,
In the interstice there is at least one semi-permeable boundary surface which is permeable to the light emitted by the light source and is at least partially reflective for light incident in the opposite direction.

Surprisingly, it was found that these relatively simple and inexpensive means, which can be easily retrofitted to almost any transparent touch panel, result in a significant improvement in the image perceptible by a viewer, in particular, in relation to the black value and to the contrast. At the same time, the optical impression when switched off or in the case of non-backlit "dark" image areas is improved in such a way that the ambient light does not generate any distracting (visible) artifacts and a homogeneous black overall surface is thus produced.

As can be seen from the detailed description below, the arrangement specified here creates an optical diode as it were, which allows the light of the polarized light source to pass without any significant attenuation or other observable change in the image display towards the viewer, but inside practically "swallows" the ambient light coming from the outside and prevents it from being reflected back to the viewer. In this way, the aforementioned advantages are achieved.

All this is possible without the optical bonding of the polarized light source with other optical units necessary in the prior art, which is complex and technically hazardous in terms of time, machine use and costs.

Advantageous variants are the subject of the dependent claims and the following detailed description of an exemplary embodiment.

Advantageously, the light source comprises a display which emits polarized light. If necessary, a display emitting light which is in itself unpolarized is located upstream of an additional polarization filter with the polarization direction adjusted relative to the retarder.

Advantageously the light emitted by the light source is linearly polarized. The polarization filter of the optical arrangement is advantageously a linear polarization filter, and the retardation layer is preferably an $\lambda/4$ layer, namely either a clockwise $+\lambda/4$ layer or a counterclockwise $-\lambda/4$ layer.

In an expedient embodiment, the polarization filter and the retardation layer are designed such that the light emitted by the light source passes through the polarization filter in a through-direction with regard to its polarization. This ensures minimal attenuation of the luminosity perceptible by the viewer.

Advantageously, in addition to the retardation layer and the polarization filter, the layer arrangement comprises a number of further layers, wherein preferably all the adjacent layers of the layer arrangement abut each other free of gaps.

In an advantageous embodiment, viewed in the viewing direction of a viewer, a transparent functional layer, in particular, a functional layer having touch sensors, is arranged in front of the polarization filter.

Viewed in the viewing direction of a viewer, advantageously there is a transparent protective layer, for example made of glass or plastic, which can in particular form a control surface for an underlying functional layer with touch sensors. In other words, the transparent protective layer can be equipped with other functions such as a control surface, impression object, display area, etc. and is subject to extensive design freedom.

Abutment of the layers free of gaps in the optical stack is important firstly in preventing scattered light from outside from penetrating the beam path, which would otherwise create distracting artifacts (as a result of other optical boundary surfaces between media with different optical densities) and would also adversely affect the contrast and black level. Secondly, the optical components are much easier and more inexpensive to process in the application as a result. Prior to assembly, all the functional layers from the touch layer through the polarization filter to the retarder can be set up as a film using a simple and inexpensive process and be applied to the rear side of a (multifunctional) protective layer in a likewise simple and inexpensive (and level) process. In this sense, the protective layer in a preferred embodiment can be seen as a (mechanical) structural element or basic element for the overall arrangement.

Furthermore, the at least one semi-permeable boundary surface in the interstice is advantageously realized by an additional optical layer, for example a plate or film, which is arranged in the interstice between the light source and the aforementioned layer arrangement specifically for this purpose. Particularly preferably, however, it can also comprise a so-called parasitic layer inside another existing optical component which realizes the required semi-permeability in the aforementioned sense quasi as a desired side effect of another function. "Semi-permeable" means that the boundary surface or layer is permeable to the light emitted by the light source and is at least partially reflective for light incident in the opposite direction. As a result, during reflection the light falling into the optical arrangement from outside is "detuned" with regard to its polarization so that it does not exit to the viewer again but is blocked at the polarization filter.

More precisely, in the preferred embodiment comprising a linear polarization filter and $\lambda/4$ retarder, incident light in the optical arrangement from outside is in part "detuned" with regard to its polarization by non-directional (multiple) reflections, and in part reflected back directly onto the retarder. Both parts then pass through the retarder a second time (but now in the opposite direction "from behind") and are rotated again by + or $-\lambda/4$ (depending on the structure) in the polarization direction. As a result, the majority of the light cannot pass through the polarization filter as its forward direction is offset by twice $\lambda/4=\lambda/2$ from the main part of the light exiting the retarder and thus blocks this light.

In a preferred embodiment, the combination of a multifunctional protective layer, a polarization filter, an optical retardation layer and if applicable, other optical components within a frame or housing is designed as a fixture for mounting on or for retrofitting with a display, wherein the absorptive peripheral surfaces can constitute the mechanical connection of this combination and the display—for example, in the form of a black, machine-applicable and permanently elastic sealing foam or a self-adhesive, black, foam rubber punched part.

Hereinafter an exemplary embodiment is described with reference to a diagram.

BRIEF DESCRIPTION OF THE SEVERAL VIEWS OF THE DRAWING

The FIGURE shows the structure and operating principle of an optical arrangement according to the invention in the manner of a schematic diagram.

DETAILED DESCRIPTION OF THE INVENTION

The optical arrangement 2 shown in the FIGURE serves to improve the contrast perceptible by a viewer 4 and the color saturation of a display 6 when switched on and to achieve a "black panel" effect—namely, a homogeneous black surface when switched off or in dark image regions. Without this optical arrangement 2, the visibility and the brightness and color of the installed display 6 when switched off changes with the installation site or as a result of the ambient light and thus forms an optically disturbing or distracting element. With the optical arrangement 2, on the other hand, when switched off the area behind which the display 6 is installed always remains "invisible" because from there no light can fall back onto the viewer 4 and this area thus appears homogeneously black.

The example is a display 6 which emits linearly polarized light. In general, the display 6 can be seen as a two-dimensionally extended, structured or modulated light source 26 for polarized light, wherein the brightness of the light source 26 may vary between individual pixels. The polarization direction of the emitted light is indicated here by arrows inside the display 6.

At a distance a different from zero in front of the surface of the display 6, there is preferably—but not necessarily—an optical layer arrangement 8 parallel to the display 6 which, viewed in the viewing direction of the viewer 4 of the display 6 along the optical axis 10 comprises a linear polarization filter 12 and a retardation layer 14 (also referred to as a waveplate or retarder) behind the same, in particular, in the form of a $\lambda/4$ layer or plate. In front of the polarization filter 12 there may also be a functional layer 30 with touch sensors and in front of the same, a transparent protective layer 16 as a cover and/or structural element. The touch sensors and/or another functionality can also be integrated into the protective layer 16 (multifunctional protective layer). There is no gap between the individual layers of the layer arrangement 8—departing from the purely diagrammatic drawing in the FIGURE. Rather, the polarization filter 12 lies directly flush against the retardation layer 14 on its side facing the display 6. On its side facing away from the display 6, the polarization filter 12 lies directly flush against the functional layer 30 which in turn, on its other side, lies directly flush against the foremost layer of the layer arrangement 8, namely the transparent protective layer 16.

The term optical axis 10 is to be understood in a broad sense here and does not require the optical arrangement 2 to be strictly symmetrical. In a preferred variant, $\lambda$ denotes the average wavelength of the visible light emitted by the display 6.

The retardation layer 14 rotates the polarization direction of the linear polarized light emitted by the display 6 towards the viewer 4 by a defined angle. In the present case, the angle of rotation is chosen in such a way that the polarization direction of the light emitted by the display 6 after passing through the retardation layer 14 is parallel to the forward direction of the linear polarization filter 12.

It is shown by the arrows in the FIGURE purely by way of example that the polarization direction of the light emitted by the display 6—seen from the viewer 4—is rotated clockwise from the vertical by 45° (=Π/4), and the retardation layer 14 produces a 45° rotation of the polarization orientation in a clockwise direction so that the light can then cross the polarization filter 12 unimpeded, here with a vertical forward direction. In other words, the light emitted by the display 6 passes through the layer arrangement 8 with minimal transmission losses, but otherwise unchanged with regard to its perceptible properties and then reaches the viewer 4.

The preferably air or gas-filled interstice 18 between the display 6 and the layer arrangement 8 is optically impermeable or opaque at its external boundary surfaces or peripheral surfaces 20. Here, in the example with a rectangular display 6 and essentially congruently shaped layer arrangement 8, there are four peripheral surfaces 20 which are rectangular in outline and form an outer surface of the cuboid interstice 18. Optically impermeable means that ideally no light can enter the interstice 18 from the outside through the peripheral surfaces 20. Light from outside (ambient light) can only enter the interstice 18 through the layer arrangement 8.

Furthermore, the peripheral surfaces 20 are optically absorptive with regard to the light present in the interstice 18, i.e. designed as an optical sink. In other words, ideally no light from inside can pass through the peripheral surfaces 20 to the outside into the environment, and that also there is no significant reflection or scattering of the light present in the interstice 18 on the peripheral surfaces 20. Rather, light incident from inside on the peripheral surfaces 20 is at least largely absorbed.

Furthermore, in the interstice 18 between the display 6 and the layer arrangement 8, preferably—but not necessarily—in parallel alignment with the display 6, at least one, preferably several, boundary surfaces 22 optically transparent for the light emitted from the display 6 to the viewer 4 is arranged, for example, as a component of a film or other layer that advantageously affect its polarization as little as possible. In the opposite direction, however, i.e. for light which impinges on the display 6 from the viewer 4, these boundary surfaces 22 are at least partially and preferably as completely as possible reflective. In other words, the boundary surface(s) 22 in the present example realizes the function of a one-way mirror or semi or partially transparent mirror. In simple terms, reference is also made to a semi-permeable boundary surface 22 or layer, by which the operating principle described above is meant, namely (partially) transparent in one direction, and (partially) reflective in the other direction.

Instead of a separate layer reserved for that purpose, the (partially) reflective/transparent boundary surfaces can also be realized as so-called parasitic boundary surfaces of existing films, glass, or the like (e.g. the display surface).

The position of the semi-permeable boundary surfaces 22 can be freely selected between the polarized light source 26 and the retardation layer 14, i.e. within the stretch characterized by the distance a.

With regard to the unpolarized ambient light entering the optical arrangement 2 from outside, the combination of a polarization filter 12 and a retardation layer 14 can be viewed as a circular polarization filter 24. Here in the example, this is indicated by a helix which represents an incident clockwise circularly polarized beam from outside through the layer arrangement 8 into the interstice 18 between the optical layer arrangement 8 and the display 6.

This incident beam from outside is reflected on the reflective layers 22 and thus becomes the counterclockwise polarized, outward beam which generally speaking cannot pass the combination of retardation layer 14 and polarization filter 12 any longer or only to a small extent on account of the polarization no longer being "suitable". This is because the light on the retardation layer 14 is once again rotated by $\lambda/4$ and is thus present in the blocking direction at the polarization filter 12—so that it is largely absorbed at the polarization filter 12. Incident scattered light from inside onto the peripheral surfaces 20 is also absorbed, as aforementioned.

In a particularly simple prototype, the polarization filter 12 on the front is oriented with a given polarization direction, the retardation layer (retarder) 14 is designed as a $-\lambda/4$ layer (i.e. counterclockwise), and the polarization filter of the rear light source 26 or the display 6 is oriented with its polarization direction at +45° to the polarization direction of the polarization filter 12 so that after passing through the retardation layer 14, the polarized light can exit freely through the polarization filter 12.

An alternative arrangement with a $+\lambda/4$ retarder and a polarized light source 26 oriented at −45° to the polarization direction of the polarization filter 12 functions analogously.

In a corresponding generalization, all combinations in which a given polarized light source 26 is adjusted by means of suitable additional runtime adjustments (by retarders) to a relative polarization direction "suitable" for the front-side combination of the polarization filter 12 and the retardation layer 14 according to the aforementioned description function likewise.

As a result, the light emitted by the display 6 passes through the optical arrangement 2 to the viewer 4 outside without any significant attenuation, while ambient light incident from outside and internally reflected is largely absorbed and no longer passes to the viewer 4 outside. As a result, the black value of the image represented by the display 6 is significantly improved, the contrast perceptible by the viewer 4 is significantly increased and the "black panel" effect described above is ensured.

Here are some more design-related details and general comments now:

Polarization filters can be produced using very different methods today, for example, as stretched films based on poly acetate, micro and nano molded wire grid structures on various substrates, usually by means of UV or reactively curing liquid polymers or also by means of precision hard stamping of suitable optical structures. Lacquer-like layers with functional liquid crystals are also in use today. This results in a very large variation in thickness from a few nanometers up to several millimeters—depending on the substrate. In the present example, layer thicknesses of up to a few hundred micrometers are preferred. The same applies to the retardation layer, the protective layer, and the semi-permeable layer/boundary surfaces.

The distance a between the layer arrangement 8 and the light source 26, i.e. the length of the interstice 18, is preferably short as the intensity of the beams decreases by the square of the linear path length, but is not otherwise subject to any significant restriction. In a prototype produced for test purposes, the distance a is approximately 4 to 5 millimeters, for applications in instrument or control panels of, for example, household appliances, the preferred distance will be from just under 1 millimeter to a few centimeters.

It is clear that the geometry of the optical components shown in the FIGURE is selected purely by way of example and may vary in practice. In particular, from a global (macroscopic) perspective, the display 6, the layer arrangement 8 and the semi-permeable layer or boundary surface(s) 22 may be curved/bent and only locally approximately flat, as long as the mechanical deformation gradients do not become smaller than at least twice the wavelength of the radiation concerned.

In the present case, the optical arrangement 2 is preferably designed for visible light in a wavelength range from approx. 380 to 800 nanometers. However, the operating principle described applies in principle to all wavelengths. The optical bandwidth generally depends on the quality and the material properties of the optical components used.

In general, all the layers/boundary surfaces of the optical arrangement 2 intersect the optical axis 10, but the layer arrangement 8, the boundary surface(s) 22, the display 6 or the light source 26 need not necessarily be plane-parallel to one another or to other boundary surfaces.

In addition to the optically absorptive peripheral surfaces 20 which surround the interstice 18 between the display 6 and the layer arrangement 8, there may also be optically absorptive subdivisions of the interstice 18 in parallel alignment to the optical axis 10.

The optical layers of the layer arrangement 8 and/or the partially reflective layer(s) 22 can, in particular, be designed as flexible films.

The optical layers in the layer arrangement 8 can be permanently connected to one another, for example, by means of transparent, non-birefringent adhesive in liquid form or as an adhesive layer with or without a substrate, in particular, using a simple, flat lamination method, even in very large quantities and also endlessly glued.

The absorptive peripheral surfaces 20 or boundary surfaces surrounding the interstice 18 can be realized by means of various materials with non-reflective, dark, preferably black (because spectrally neutral) surfaces, for example, by black foam rubber or also by means of foam seals that can be applied by CNC or corresponding injection molded parts or other molded parts. These molded parts can also be designed for a mechanical connection between the light source 26 and the remaining optical arrangement 2.

The display 6 can be any conventional monochrome or color display (or also a custom-made product) which emits linearly or circularly polarized light, in particular, a liquid crystal display (LCD). If the display 6 itself does not emit any linearly polarized light, an additional polarization filter and/or a retarder can be used to realize the flat light source 26 for linearly polarized light presupposed in the example. This enables the invention described here to be used for any kind of display technology, for example, also for plasma displays, electroluminescent displays or OLED displays—even simple backlit fonts and symbols in all colors can be used here. Combinations of different display types with different polarization directions can also be used at the same time if the individual displays are each adjusted to the given optical structure comprising the polarization filter 12 at the front and the retardation layer 14 using suitable retarders.

The combination of layer arrangement 8, partially reflective layers 22 and if applicable, absorptive peripheral surfaces 18 can be designed as a fixture inside a frame or housing which is placed on the display 6 and is permanently connected thereto. In particular, the display 6 used remains easily interchangeable at any time for repairs and/or upgrades/improvements/product variants.

Preferred applications are, for example, in the field of automobile manufacture, aircraft construction, shipbuilding and railway construction, for the cockpit or driver or passenger instrumentation, respectively. Other preferred applications are in the area of displays for household appliances. In general, within the scope of the present invention, any touch panel applications desired can be realized in all industrial sectors and applications—wherever displays, preferably with additional functions such as, for example, touch control, privacy film, etc., are used or installed as a modular combination unit, where therefore an inseparable unit is NOT necessary or desired.

LIST OF REFERENCE CHARACTERS

2 Optical arrangement
4 Viewer
6 Display
8 Layer arrangement
10 Optical axis
12 Polarization filter
14 Retardation layer (retarder)
16 Protective layer
18 Interstice
20 Peripheral surface
22 Boundary surface
24 Circular polarization filter
26 Light source
30 Functional layer
40 Viewing direction
a Distance

The invention claimed is:

1. An optical arrangement, comprising the following components arranged along an optical axis:
   a light source for polarized light;
   a layer arrangement with, viewed in a viewing direction of a viewer, at least one polarization filter and an optical retardation layer behind said at least one polarization filter, said polarization filter abutting said retardation layer free of gaps;
   said light source and said layer arrangement being disposed with an interstice therebetween, said interstice forming a volume about the optical axis and said volume being surrounded by optically impermeable and internally non-reflecting, but absorptive peripheral surfaces; and
   at least one semi-permeable boundary surface in said interstice, said boundary surface being permeable to the light emitted by said light source and at least partially reflective for light incident in an opposite direction.

2. The optical arrangement according to claim 1, wherein said light source comprises an electronic display and, optionally, an upstream additional polarization filter.

3. The optical arrangement according to claim 1, wherein the polarized light emitted by said light source is linearly polarized.

4. The optical arrangement according to claim 3, wherein a polarization plane of said light source is adjustable relative to said retardation layer.

5. The optical arrangement according to claim 1, wherein said polarization filter is a linear polarization filter.

6. The optical arrangement according to claim 1, wherein said retardation layer is a clockwise rotating $+\lambda/4$ layer or a counterclockwise $-\lambda/4$ layer.

7. The optical arrangement according to claim 1, wherein said polarization filter and said retardation layer are constructed in such a way that the light emitted by said light source passes through said polarization filter in a forward direction with regard to a polarization thereof.

8. The optical arrangement according to claim 1, wherein said layer arrangement comprises a plurality of further layers in addition to said retardation layer and said polarization filter, and wherein all respectively adjacent layers of said layer arrangement abut one another free of gaps.

9. The optical arrangement according to claim 8, further comprising a transparent functional layer disposed in front of said polarization filter in the viewing direction of the viewer.

10. The optical arrangement according to claim 9, wherein said functional layer includes touch sensors.

11. The optical arrangement according to claim 1, further comprising a transparent protective layer forming a frontmost layer of said layer arrangement in the viewing direction of the viewer.

12. The optical arrangement according to claim 11, wherein said protective layer forms a control surface.

13. The optical arrangement according to claim 1, wherein said semi-permeable boundary surface is a separate optical layer disposed in said interstice.

14. The optical arrangement according to claim 1, wherein said layer arrangement is formed within a frame or housing, and said frame or housing is configured for attachment to a display.

15. A display device, comprising:
- a display; and
- an optical arrangement according to claim 1 for improving a perceptible contrast of said display and for eliminating disturbing ambient light influences.

* * * * *